US006665672B2

(12) United States Patent
Myers et al.

(10) Patent No.: US 6,665,672 B2
(45) Date of Patent: Dec. 16, 2003

(54) TRANSACTION/OBJECT ACCOUNTING METHOD AND SYSTEM

(75) Inventors: Lance M. Myers, San Francisco, CA (US); Celia C. Chow, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 97 days.

(21) Appl. No.: 09/183,675

(22) Filed: Oct. 30, 1998

(65) Prior Publication Data

US 2003/0014380 A1 Jan. 16, 2003

(51) Int. Cl.[7] .............................................. G06F 17/30
(52) U.S. Cl. ..................... 707/10; 707/201; 709/200; 713/200
(58) Field of Search ...................... 709/200; 713/200; 707/10, 201

(56) References Cited

U.S. PATENT DOCUMENTS

| 5,251,044 | A | | 10/1993 | Ikegaya | |
|---|---|---|---|---|---|
| 5,539,665 | A | | 7/1996 | Lamming et al. | |
| 5,659,845 | A | | 8/1997 | Krist et al. | |
| 5,699,493 | A | | 12/1997 | Davidson, Jr. et al. | |
| 5,740,427 | A | | 4/1998 | Stoller | |
| 5,797,006 | A | * | 8/1998 | Sitbon et al. | 707/2 |
| 6,030,288 | A | * | 2/2000 | Davis et al. | 463/29 |
| 6,073,160 | A | * | 6/2000 | Grantham et al. | 709/200 |
| 6,330,677 | B1 | * | 12/2001 | Madoukh | 713/200 |
| 6,389,431 | B1 | * | 5/2002 | Frolund et al. | 707/2 |
| 2002/0029200 | A1 | * | 3/2002 | Dulin et al. | 705/67 |
| 2002/0073132 | A1 | * | 6/2002 | Van Garderen et al. | 709/102 |

FOREIGN PATENT DOCUMENTS

| GB | WO-99/49431 | * | 9/1999 | ........... G07F/19/00 |

* cited by examiner

*Primary Examiner*—Charles Rones
(74) *Attorney, Agent, or Firm*—Fay, Sharpe, Fagan, Minnich & McKee, LLP (57) ABSTRACT

A symmetrical accounting method and apparatus uses a DSA agent within each node of a computer network. The agents monitor their respective nodes for outgoing and incoming transactions and transparently generate accounting data upon detecting the transactions. The accounting data is temporarily cached for later downloading to an accounting database. The method and apparatus is adaptable to a variety of accounting information through the use of verb sets and user modifiable extension records. The method and apparatus is symmetrical because accounting information is collected on both sides of a transactional conversation or object method to object method call.

13 Claims, 7 Drawing Sheets

Account Header

FIG.3A

Example Extension Record (optional)

FIG.3B

Trailer Record

FIG.3C

Account Record (after roll-up)

TRANSACTION/OBJECT ACCOUNTING METHOD AND SYSTEM

BACKGROUND OF THE INVENTION

1. Field of the Invention

The invention pertains to the art of general accounting mechanisms for use in transaction and object-based systems and, more particularly, to automated middleware that transparently generates a symmetrical database of transactions in a system. The information is symmetrical because accounting information is collected on both sides of a transactional conversation or object method to object method call.

2. Description Of Related Art

Businesses that make large capital outlays for equipment often desire to track the usage of that equipment. The reasons for tracking usage are as varied as business itself, but among the more typical rationales for engaging in this type of accounting are 1) to assess the profitability of the purchase or lease, 2) to charge equipment use to various divisions or clients by actual usage, or 3) to reallocate a usage schedule for the equipment on a desired basis (e.g. fairness, efficiency, profitability etc.).

An early known method of tracking usage involved time intensive manual bookkeeping. When a user operated the equipment, the user made an entry in a logbook to document use of the device. Unfortunately, this manual method suffered from several inefficiencies. First, the logbook method is time consuming. At times the accounting effort exceeded the device use. This undesirably made the accounting "cost" more than the equipment use. Secondly, the logbook method is only as accurate as the users are diligent in their accounting. This undesirably made the logbook an imperfect mirror of equipment usage, defeating the purpose of accounting. Thirdly, the logbook method is asymmetrical in that the log itself dictates where the information is accumulated. This undesirably limits the usefulness and the analysis potentially available. The asymmetry also causes inaccuracies in that one "task" may be divided into several sub-tasks. For example, a task may originate on a computer terminal for composing, then move to a superior for editing, and finally onto a printer and a copier for distribution. Fourthly, the logbook system becomes unwieldy as the number of items to account for increases. As organizations push to become ever more efficient, a need exists to account for as many resources as possible, including not only main frame computers, but also other computer peripherals and perhaps even personnel.

Thus, a system is sought that overcomes these shortcomings. The advent of computer monitoring has somewhat helped to alleviate the administrative burden. For example a system in which a printer tracks accounting information is disclosed in U.S. Pat. No. 5,699,493 to Davidson, Jr. et al. and is incorporated here by reference. The Davidson system places the printer in the role of data collector. Previous systems typically accounted for print jobs only on the requesting computer (if accounts were kept at all). That is, the previous system was unilateral vis-à-vis the requesting computer. Davidson, essentially turns the previous system around by having the printer accumulate accounting data, resulting in a unilateral system vis-à-vis the printer.

Another accounting system for a document processing system which executes potentially several jobs over multiple processing facilities is described in U.S. Pat. No. 5,659,845 to Krist et al., incorporated herein by reference. A unique identifier is assigned to a job which remains associated although the job is reduced to several smaller jobs. An accounting log manager correlates the accounting information and saves the result in a file. While the Krist method is easier than the manual system described above, it is not symmetric in that it only tracks the use of the document processing system.

BRIEF SUMMARY OF THE INVENTION

The present invention contemplates a new, efficient method of implicitly generating a symmetrical accounting database regarding transactions on a computer network that overcomes the above-referenced problems and others.

In accordance with the present invention, there is provided a transaction accounting system supporting a system and/or network containing two or more principals. Principals are defined as users (programmatic or human) of the system and/or network. The principals are in communication with each other and thus are capable of requesting and performing transactions and/or methods. Further included in the system are means for recognizing the transactions between principals and means for generating an accounting record after recognizing the transaction or method. Lastly, means for later forwarding the accounting record to a database are also included.

In accordance with another aspect of the present invention, the means for recognizing, generating, and forwarding is one of a plurality of software agents, each principal having such an agent.

In accordance with another aspect of the present invention, a globally unique transaction identifier used for a root transaction is used for all other accounting records generated after the root transaction.

In accordance with another aspect of the present invention, the accounting record includes at least a time stamp, a globally unique transaction identifier, a locally generated conversation identifier, the name of the principal (program or human) originating the transaction or call, the name of the transaction or method in use at the time, the name of the principal receiving the transaction or call, and the name of the transaction or method being invoked.

In accordance with another aspect of the present invention, the agent further selectively generates and appends an extension record to the accounting record. The extension record includes the locally generated conversation identifier and the globally unique transaction identifier. Also added are an extension length indicator and an extension type indicator, along with a billable indicator. Additionally, a plurality of extra data fields supplied by the application in use when the transaction was made are provided.

In accordance with another embodiment of the present invention, a method of generating an accounting database of transactions on a computer network having a plurality of nodes is shown. The method consists of monitoring each node for either an outgoing or an incoming transaction. The method further generates an accounting record on detecting the transaction and caches the accounting record temporarily. Periodically the accounting record is downloaded to the accounting database. These steps are repeated continuously during network operation.

In accordance with another aspect of the present invention, the steps above occur transparently to a user.

In accordance with another aspect of the present invention, the accounting record comprises an extension record. The extension record consists of additional data fields provided by the application in use.

In accordance with another embodiment of the present invention, an automated symmetrical data collection apparatus for generating and storing a plurality of accounting records on a network of computing nodes is shown. The data collection apparatus includes a middleware agent in each node. Every agent monitors their node for a transaction between an operating system and any user interface applications loaded onto the node. When a transaction is noted, the agent generates an accounting record. The data collection apparatus also includes a temporary storage device, addressable by the agent, capable of receiving and holding the accounting record. Additionally, a database is included for receiving and storing the accounting record from the temporary storage device.

In accordance with another aspect of the present invention, the same globally unique transaction identifier is propagated down a transaction tree constructed by subsequent transactions. The globally unique transaction identifier is then used to correlate a set of (possibly nested) transactions performed by independent nodes.

One benefit obtained by use of the present invention is that the accounting information is collected automatically, that is, without requiring user action. This saves the user from a programming task and improves compliance with accounting procedures providing a more robust database.

Another benefit obtained by use of the present invention is that the accounting information is collected, thus analyzable on both the sending and receiving ends of the transaction. That is, the information collected is symmetrical and able to be cross-referenced.

Other benefits and advantages of the subject new method will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein.

DETAILED DESCRIPTION OF THE PREFERRED EMBODIMENT

Figure 1:
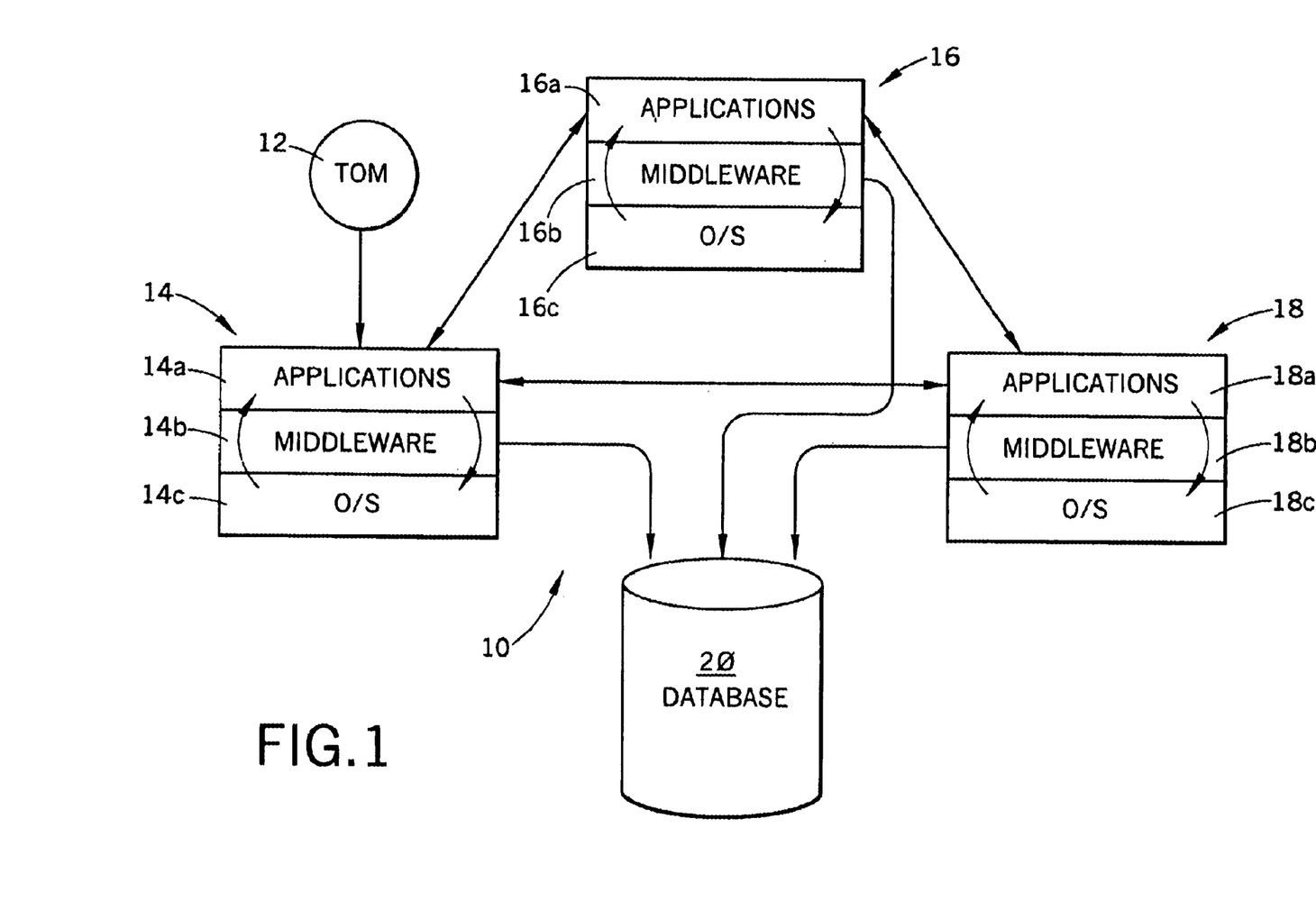
FIG. 1 is a simplified block diagram of a system according to the present invention.

Turning now to the drawings, wherein the showings are for purposes of illustrating the preferred embodiments of the invention, and not for purposes of limiting same, an example system according to the present invention is shown generally designated 10. For ease of comprehension, FIG. 1 shows a three-node network with a database although any larger number of nodes and/or databases are possible. A principal 12 (Tom) is a user of a computer system 14. A principal is a named registered collection of transaction methods and the agent that represents the collection. For instance, computer programs, people, equipment, or other network service providers can be principals. In this example, Tom 12 is a human user of the network 10. Tom's computer 14 can be thought of as three general components, namely, applications 14a, an operating system 14c, and middleware 14b which lies in between the applications and the operating system. Middleware is used to describe software that is located on top of an operating system and connects otherwise separate applications between the user interface and the operating system of the computer. The present invention lies in middieware and is referred to as Tom's agent in this example. The middleware agent 14b is a program which assumes the identity of the person or other principal it is representing. The middleware agent 14b is a 'spokes-program' for principal Tom 12.

Figure 2:
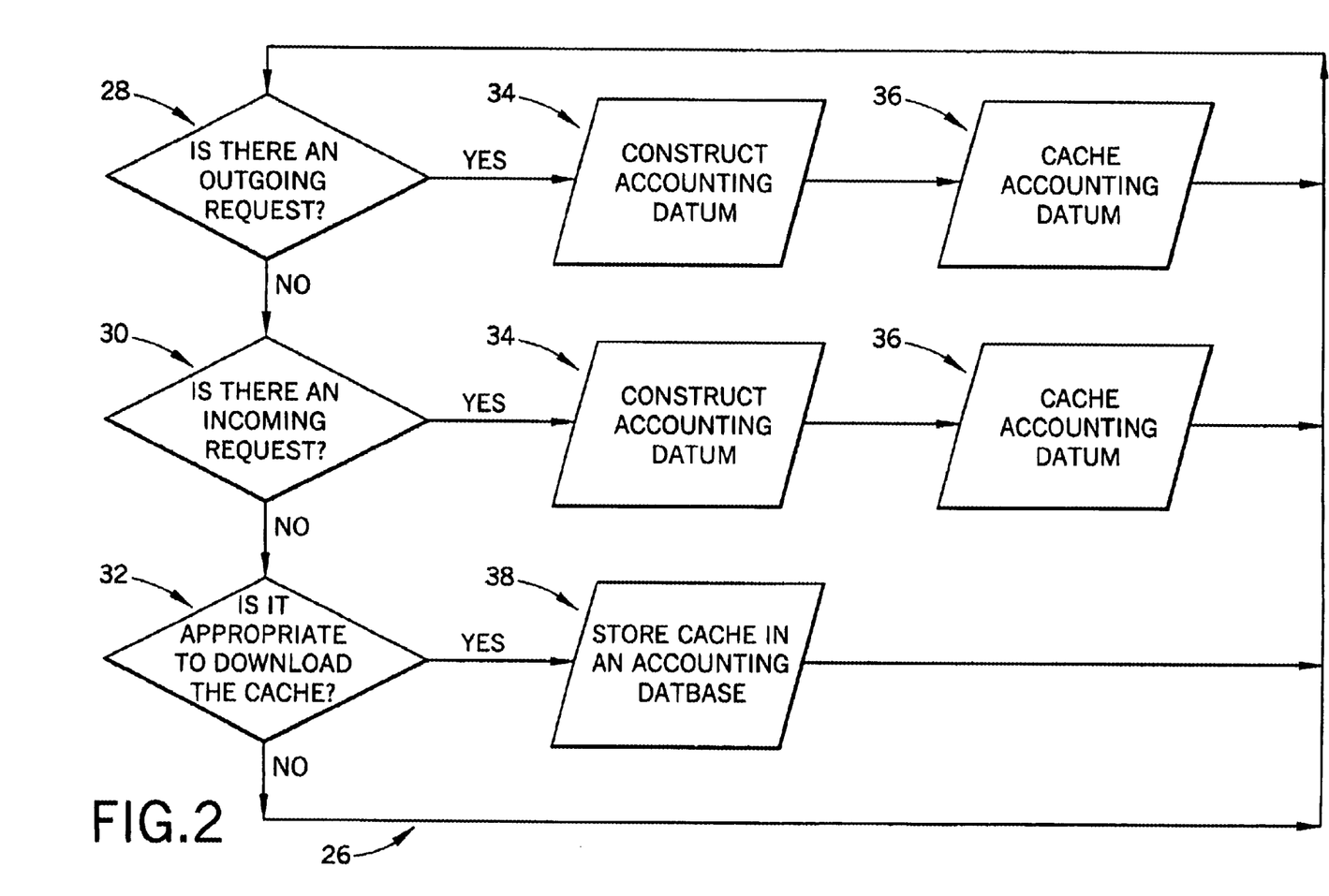
FIG. 2 is a general flowchart of the method of the present invention.

The middleware agent's tasks can be appreciated by referring to FIG. 2 where the accounting middleware is generally designated 26. Starting at decision block 28 the middleware 26 determines if an outgoing transaction is being exchanged between the operating system and an application. An outgoing transaction is most commonly a communication with another node on the network (e.g. a print request), but could also be an accessing of information or a program within a node. If there is no outgoing transaction, the method proceeds to decision block 30 where the presence of an incoming transaction is detected. An incoming transaction is the corollary to the outgoing transaction. If there is neither an outgoing nor an incoming transaction, a decision is made on the propriety of downloading any cache memory in decision block 32. The contents of the cache are forwarded to the accounting database when the cache becomes full, when the accounting service requests forwarding, or on some periodic basis determined by the implementers of the cache. Regardless, if the result out of block 32 is no, then the process returns to block 28.

On the other hand, from block 28, if an outgoing transaction occurs, the method executes block 34 where an accounting record is constructed. The accounting record comprises data available to the node without additional user input as will be more fully discussed below. Following construction in block 34, the accounting record is placed into the cache memory in block 36. After depositing the record in the cache 36, the flowchart cycles back to decide if further transactions await. If an incoming transaction is present, decision block 30 will detect it and then construct an accounting record in block 34. Before cycling back to await further transactions, the accounting record is deposited in cache memory in block 36.

If in block 32, the decision to download the cache is yes, the middleware deposits the cache into an accounting database in step 38. The present invention can be used with any type semi-permanent device to store the cache. For instance, hard drives, floppy disks, magnetic tape systems and ROM's. It is to be appreciated that the program loop structure and sequencing are but one suitable embodiment, and that the functions can be invoked asynchronously and/or in a different order with no loss of functionality.

Figure 3A:
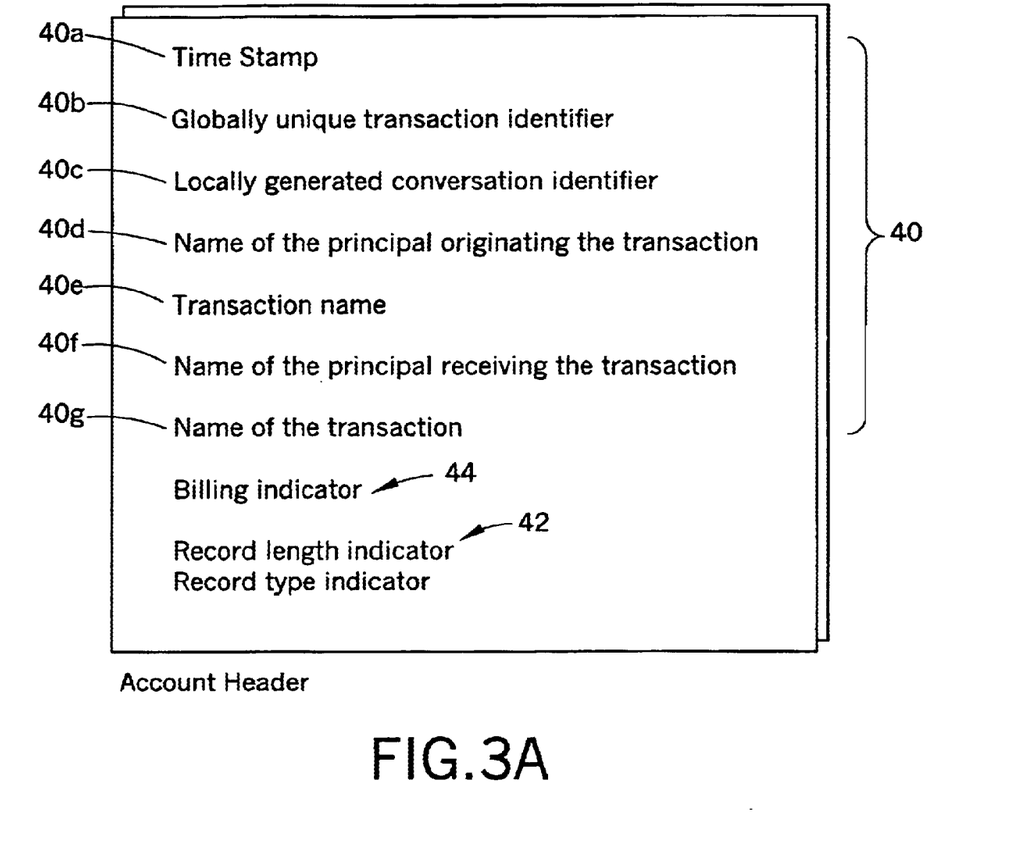
FIG. 3A is one component of the accounting information collected by the present invention.

FIG. 3A shows the embodiment of an account header generated by the middleware agent in step 34. The preferred account header consists of a septuple 40, a set of account length and type indicators 42, and a billing indicator 44. The septuple 40 consists of:

40*a* A time stamp—being the time the record was created.

40*b* A globally unique transaction identifier—being an identifier for a transaction method tree instance. The identifier is produced by the root transaction method (or the transaction service supporting it), and is propagated down the transaction tree constructed by subsequent invocations. The identifier may be used to correlate all arcs and nodes involved in a distributed, (possibly nested) set of transaction method instances.

40*c* A locally generated conversation identifier.

40*d* The name of the proximal principal.

40*e* A transaction name—being the name of a program in use when the transaction was made.

40*f* The name of the distal principal.

40*g* The name of the proximal transaction.

Two key benefits of the seven items described above are that each principal can be described using the above data, and that all the data is implicitly available within the system. That is, the user need not provide additional information beyond initiating the transaction. Also, while the data has been shown in order above, the present invention recognizes that it may be formatted in any order without loss of function.

Figure 3B:
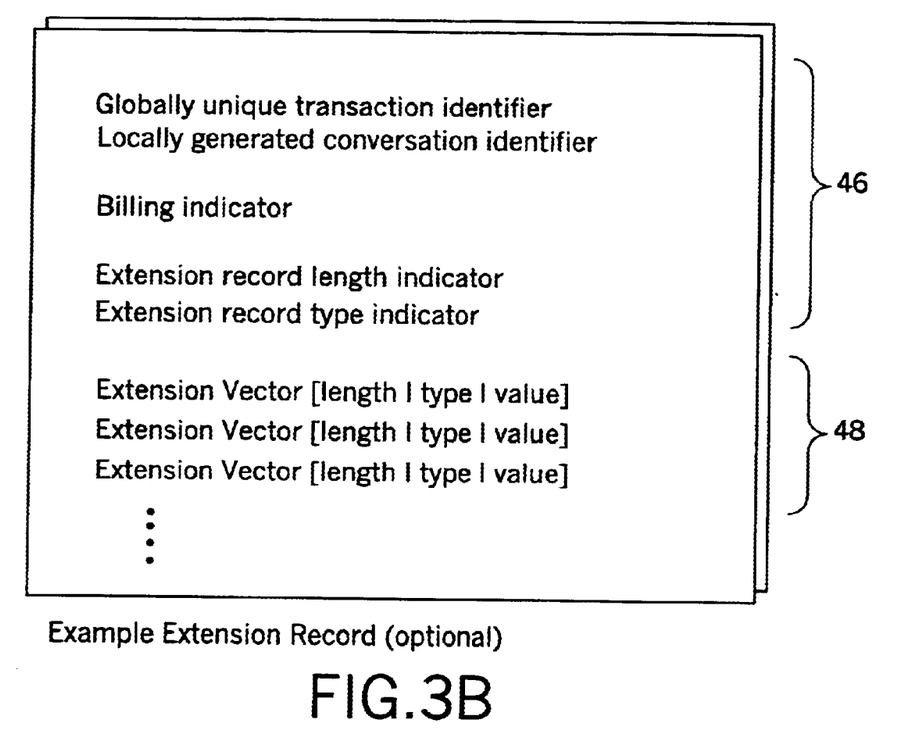
FIG. 3B is another component of the accounting information collected by the present invention.

FIG. 3B shows that optionally, an application may be written or modified to provide additional accounting data.

The present invention also envisions inclusion of additional accounting items called 'extension records.' The application provides the extension record, which is generated, cached and stored like the accounting data above. An extension record to consists of an extension header 46 and as many extension vectors 48 as necessary as shown in FIG. 3B.

Figure 3C:
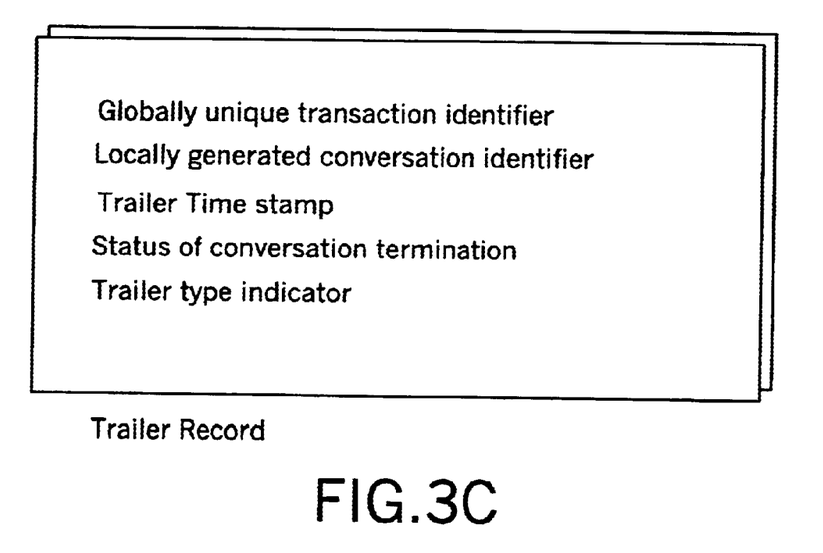
FIG. 3C is yet another component of the accounting information collected by the present invention.

Referring now to FIG. 3C, the last component of the accounting record is shown. When any transaction is completed, the trailer record is generated by the agent. By comparing FIGS. 3A, 3B, and 3C it is apparent that the all three parts of the accounting record contain some common fields. Importantly, the globally unique transaction method identifier connects the individual parts of the accounting record in addition to associating separate but related accounting records generated down a transaction tree (see FIG. 5) through successive invocations.

Figure 3D:
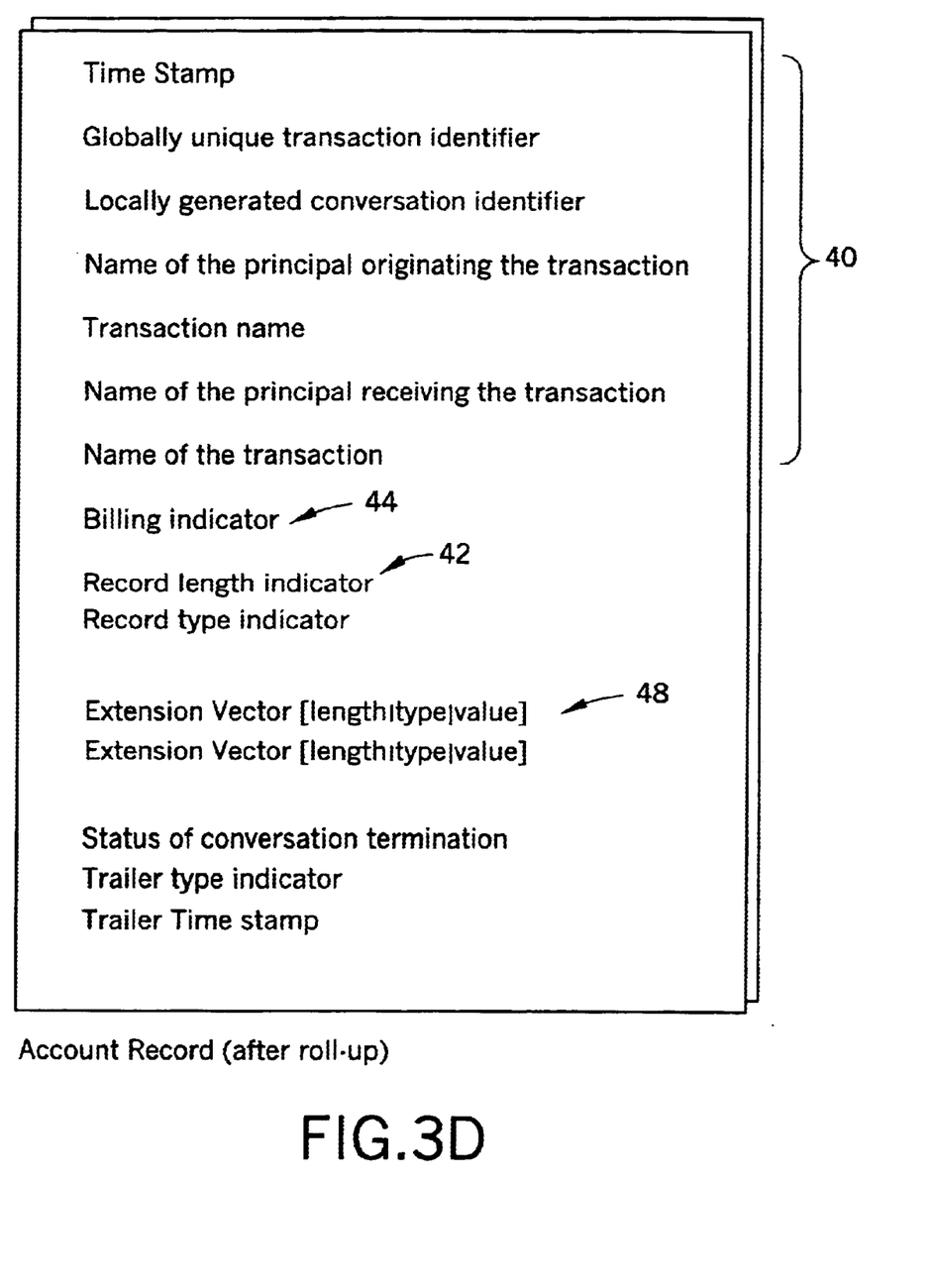
FIG. 3D is a representation of the combined accounting record of the present invention.

If a transaction starts and ends while in cache, a "roll-up" procedure combines the components of the accounting record into a single record as shown for example in FIG. 3D.

A hypothetical example cross referencing FIGS. 1–3D is illustrative. Tom 12, for example, commands his computer 14 (FIG. 1) to print the document he is working on. This initial request is called a "root transaction." The agent 14*b* recognizes this as an outgoing transaction (refer to decision block 28 in FIG. 2), generates an accounting record (refer to process block 34), and places the accounting record in cache (refer to process block 36). Again, the accounting record comprises a set of items the agent 14*b* 'knows' about the environment, thus requiring no additional information from the principal 12 or specific software package in use at the time.

While the agent 14*b* (FIG. 1) prepares the accounting record, Tom's computer 14 routes the print signal to the printer node 16. The printer 16 also has an agent 16*b* that recognizes the print signal as an incoming transaction. Similarly, the printer's agent 16*b* generates an accounting record and saves it for later deposit in the database 20. Meanwhile, the printer operating system 16*c* processes the print job. At a later time, each agent 14*b*, 16*b* downloads their respective cache memories into the database 20 for later interpretation by an account record organization program (not shown). Also recall, that the root transaction and the accounting record generated by the printer's agent will have the same globally unique transaction method identifier to facilitate the analysis.

To summarize:
1. "Tom" 12 makes a request to print a certain document.
2. Tom's middleware agent 14*b* constructs the account header containing the septuple (FIG. 3A):
   A time stamp 40*a*
   A globally unique transaction identifier 40*b*
   A locally generated conversation identifier 40*c*
   The user's name (e.g. "Tom") 40*d*
   The name of the application transaction method Tom was using when he made the request, (e.g. the "ViewCard" method in the CardCatalogLookup application) 40*e*
   The name of the identified service (e.g. "PrintService") 40*f*
   The work transaction name (e.g. "PrintDocument") 40*g*
3. Tom's middleware agent 14*b* also constructs any extension records from other information specified by the application CardCatalogLookup.
4. The account header and extension record are cached by Tom's agent 14*b* until it is convenient to forward them to the accounting database 20 system. The CardCatalogLookup application may continue adding additional accounting information, extension records, until it terminates.
5. When PrintService receives Tom's work transaction, its agent 16*b* creates a similar account header, containing the same globally unique transaction identifier, the invoker's user and application method name, the PrintService's own name and invoked application method name, a current time stamp, and any further accounting information to be recorded by PrintDocument.
6. When both Tom's CardCatalogLookup application method (ViewCard) and the PrintService application (PrintDocument) have completed, any accumulated accounting information not already sent to the accounting database system 20 will be transmitted to it.

The transmission of accounting information to an accounting service uses a simple, low cost protocol known generally in the art, and is independent of the execution of the requested or requesting functions, users or services, or their agents.

7. A billing service may extract the accounting information at a later time, based on any of the field types contained in the septuples, or on application specific information contained in extension records. For example, the two accounting records generated above may be correlated using the common globally unique transaction identifier.

Figure 4:
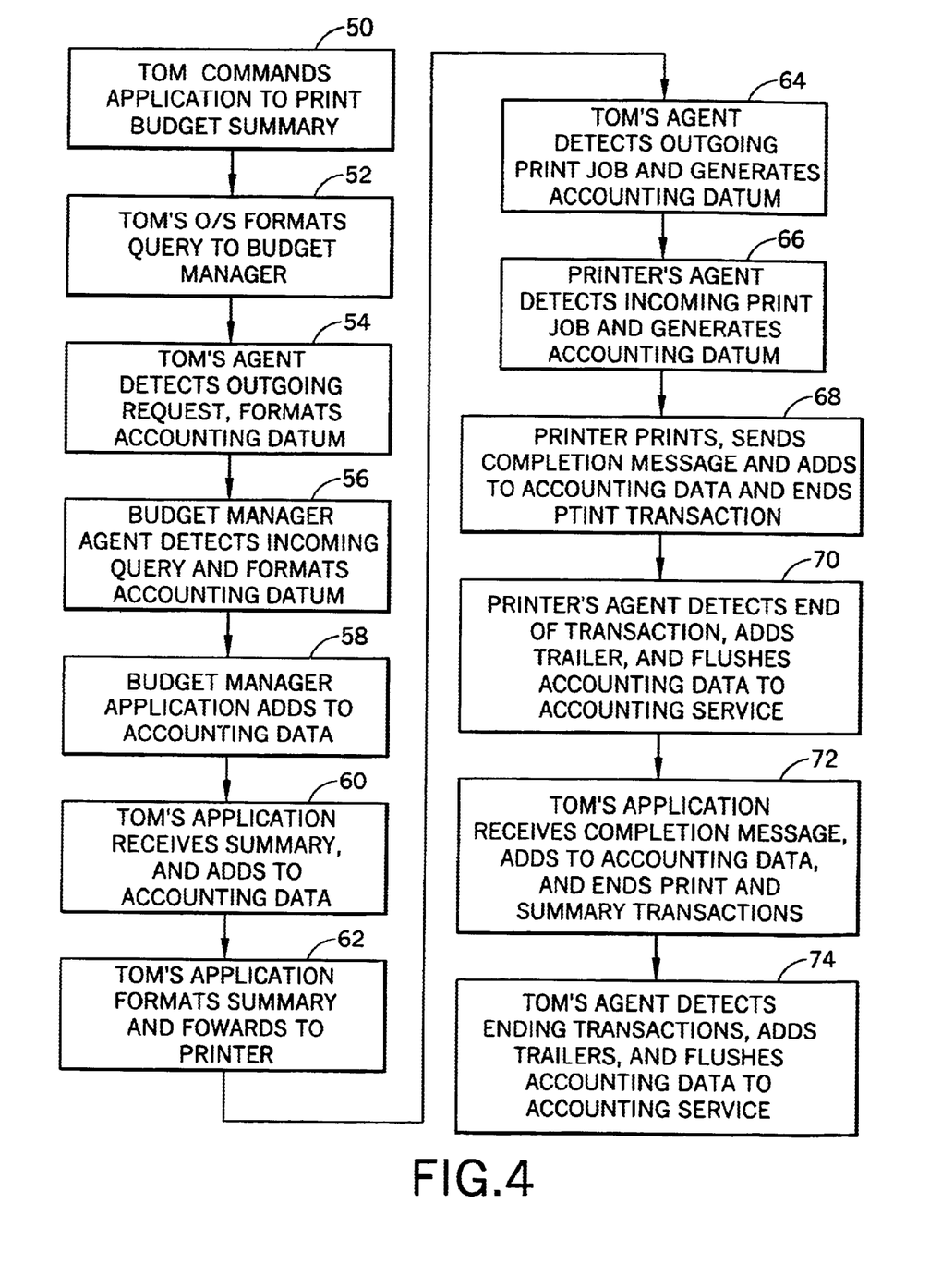
FIG. 4 is a flowcharted example of the present invention.

Cross-referencing FIGS. 1 and 4, a three node transaction is flowcharted. Assume for example, Tom 12 (FIG. 1) needs a print-out of last month's budget summary in preparation for a meeting. Tom first commands an application to print last month's budget summary 50 (FIG. 4). In response, Tom's operating system (O/S) 14*c* formats a query to the budget manager to prepare a summary of last month's budget 52. Tom's O/S 14*c* passes the formatted transaction as an outgoing transaction directed to the budget manager 18. The budget manager 18 is a corresponding principal, and can thus be a person or merely another computer system on the network. Tom's middleware agent 14*b* detects the outgoing transaction and generates an accounting record in step 54.

The budget manager receives the transaction and the budget manager's middleware agent 18b detects the incoming transaction and generates an accounting record in step 56. The budget manager's application 18a prepares the budget summary and adds to the accounting data in step 58.

Tom's application 14a receives the budget summary report from the budget application in step 60. Tom's application formats the budget summary report as a print job and forwards it to Tom's printer application as an outgoing print transaction in step 62. Tom's middleware agent detects the outgoing print transaction and again generates an accounting record in step 64.

The printer 16 receives the print job while the printer's middleware agent 16b detects the incoming print job and generates an accounting record in step 66. Meanwhile, the printer prints the job, generates a "job complete" message, adds to the accounting data and ends the print transaction in step 68. The printer's middleware agent 16b detects the end of transaction, adds a trailer and flushes accounting data to accounting service 20 in step 70.

Tom's application 14a receives the incoming job completion message, adds to the accounting data and ends the print and summary transactions 72. Tom's agent 14b detects the ending transactions, adds appropriate trailers and flushes accounting data to the accounting service 74.

Figure 5:
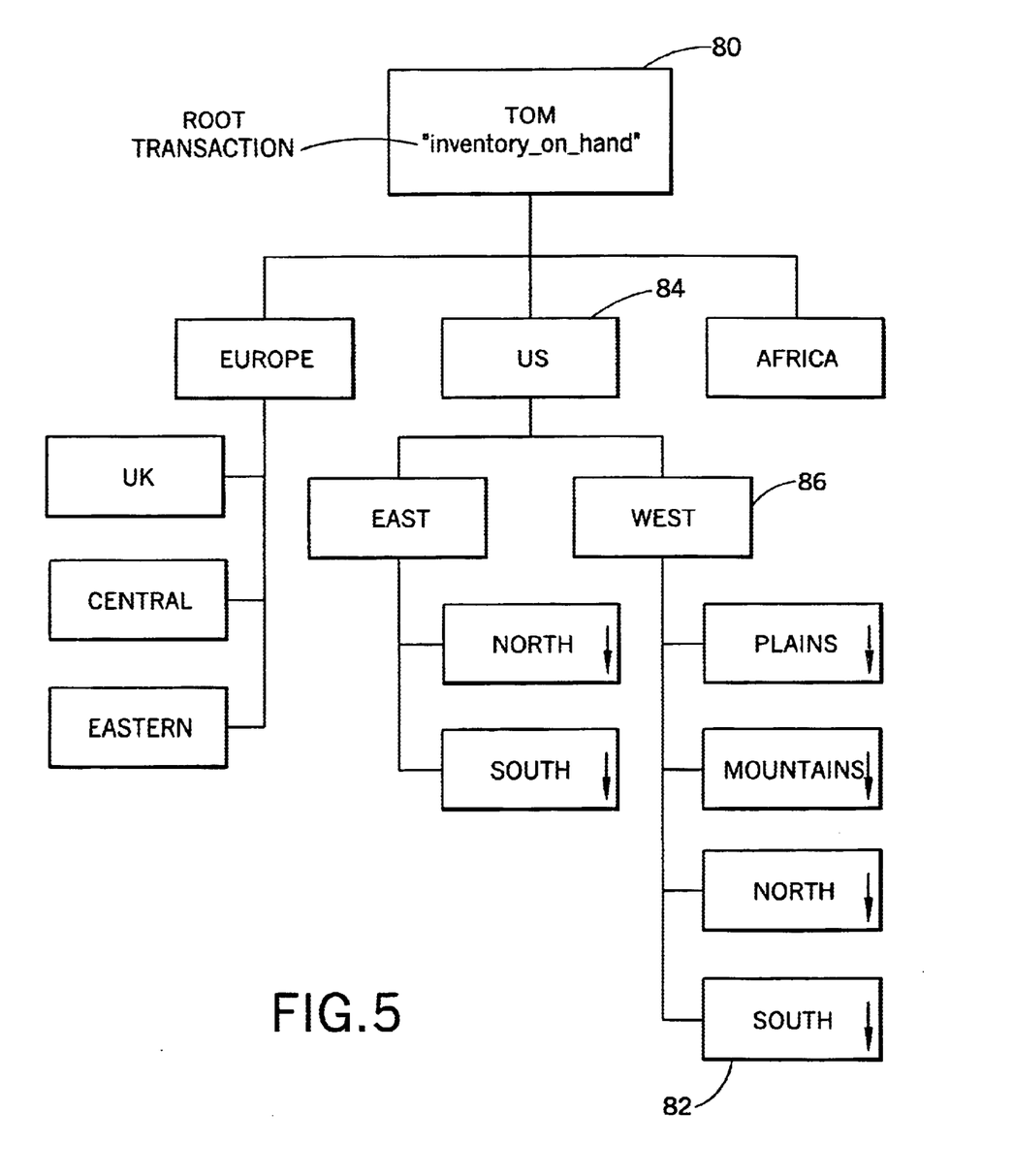
FIG. 5 is an example transaction tree capable of being accounted for by the present invention.

Significantly, the only items in the sequence of which Tom is aware are his initial command 50 and the completion message 72. The points in between including all the accounting data are collected transparently. Moreover, all accounting information associated with Tom's transaction is categorized under the original Global Identifier (GUTMID) established when the first query went out. One skilled in the art can now appreciate that a transaction tree may be generated by progressively more complicated queries calling on a greater number of nodes in larger networks. Such a tree is shown in FIG. 5 as an example. As a cursory example, Principal Tom 80 initiates a request for inventory of an office in the company's US Southwest branch 82. As is now evident, Tom 80 makes a request which is responded to by a principal in the Southwest branch 82. As above, Tom 80 only observes his own request, and the response. However, principals along the network or system have also accounted and documented the transaction, e.g. US principal 84, West principal 86, in addition to South principal 82 and Tom 80 himself.

The symmetrical nature of the information gathered by the present invention enables systems to account for usage in distributed, shared systems. Such accounting includes determining:

how much of a particular service was used by a particular department;

how much of a department's total use was for a specific service;

how much of a department's use of a service was for a particular work request (or requests); or how much of a department's total use is attributable to one principal.

The above are just a few examples of the myriad of automated accounting data available through use of the present invention. Importantly, by recording the globally unique transaction identifier, time stamps, the requesting user's (or service's) name, the requested user's (or service's) names, the requesting function (transaction) name and the requested function name, the proposed system contains the information needed to derive such accounting data as detailed above.

Equally significant is that the information contained in the accounting data (preferably the septuple described) is gathered by agents automatically, without intervention by users, services or their objects/transaction programs. Programs may also be modified to supply additional accounting information to be stored along with the accounting data. This additional information appended to the accounting record is called an extension record. Preferably, any extension records will be added on a network wide basis for symmetry by a network administrator. Moreover, it is envisioned that new or modified programs will supply the extension records via an accounting verb language such as the one described below.

Accounting Verb Sets

The following verbs are functions exported by the agents:

Account_Open_Record

Account_Open_Record creates an accumulation space within the agent and writes an account record header containing the principal names (issuing and partner), their transaction method names, the conversation id, a time stamp and a globally unique identifier.

Account_Append_Record

Account_Append_Record adds an extension vector to an account record.

Account_Close_Record

Account_Close_Record closes an account record by generating a trailer record to indicate the closing time-stamp of the conversation and marks the record eligible for movement to an account service.

Account_Flush_Record

Account_Flush_Record requests the agent to forward accumulated account records to an accounting service.

The following verbs are functions provided by the accounting service:

Account_Forward

Account_Forward copies account records from the specified accounting base to another accounting service.

Account_Retrieve

Account_Retrieve requests an agent to send its records to a particular accounting service. This is the "pull" corollary of the "Account_Flush_Record".

Account_Delete_On_Attributes

Account_Delete_On_Attributes removes accounting records from a specified account base, based on attribute types and values. Depending on the attributes specified, Account_Delete_On_Attributes can be used to erase records, entries, journals, or other organized collections.

Function Description

The following functions support the accounting verbs defined in the previous section.

Function OPEN-ACCOUNT-RECORD

This function creates an accumulation space within the agent of a principal and writes an account record header information containing the following fields:

—Account-length: The total length of the accounting record including the extension-vector(s) and the trailer record.

Account-type: The type of the record, in this case, it is an account-header.

P-1: The name of the invoking principal.

P-2: The name of the invoked principal.

TM-1: The name of the transaction method executing within the invoking principal.

TM-2: The name of the invoked transaction method executing within the invoked principal.

CID: The conversation id.

Account-GUTMID: The globally unique identifier of a transaction method tree instance.

Account-Time-Stamp: The starting time of the conversation.

Account-Billable?: The billable indicator.

For each conversation, the agent will generate one account header, zero to many extension vectors, and one trailer record.

Function APPEND-ACCOUNT-RECORD

This function adds an extension vector to an account record. Account_Append_Record is the agent verb with which a principal concatenates principal-specific accounting information to an account record.

An Extension-header has the following fields:

Ext-cid: Conversation id, as assigned in the account-header.

Ext-gutmid: As assigned in the account-header.

Ext-length: The total length of the extension vector(s).

Ext-type: The type of "extension-record".

Ext-Billable?: Billable indicator.

An Extension vector has the following fields:

Acct-Value-Length: The length of the extension vector generated by this application.

Acct-Value-Type: The user definable extension vector type. It can denote anything the user wants to collect accounting information about e.g., location, number of pages, etc.

Acct-Value: Application specific data e.g., movie name.

The user accounting information the "Acct-value" field is undefined. The acct-value-length and acct-value-type are used to specify the length and type of the "acct-value" field. The acct-value-type is an integer. It is application specific. A set of application types can be predefined, e.g. Acct-value-type=43=Location. Acct-value-type could be used to record the starting and ending time for a series of extensions.

Function CLOSE-ACCOUNT-RECORD

This function will create a trailer record when the conversation is terminated. The trailer record indicates the closing time-stamp of the conversation, and marks the record eligible for movement to an accounting service. The links to the account header, extension record and trailer record are the "GUTMID" and "CID".

A Trailer record has the following fields:

Trailer-Type: The type of "trailer-record".

Trailer-Cid: As assigned in account header.

Trailer-GUTMID: As assigned in account header.

Status: Status of the conversation termination.

Trailer-Time-Stamp: Ending time of the conversation.

Function FLUSH-ACCOUNT-RECORD

This function requests an agent to move accumulated records to an accounting service. The request is from the agent side. The "Retrieve-Account-Record" function is a request from the accounting service side.

This function can be called at any time, not necessarily at the end of the conversation. If the buffer is flushed during the conversation, the buffer is retained. The buffer will be de-allocated when the conversation is terminated.

Function FORWARD-ACCOUNT-RECORD

This function copies account records from the specified account base, keyed by attribute types and values and sends them to another accounting service. Like the Extract-Account-On-Attributes function, this function provides the capability to forward account record(s) keyed by a single attribute type and value or on any combinations. In other words, the function will forward the account record(s) based on the values of the attributes supplied. The forwarding can be performed on any of the following attribute value and/or any combinations:

P1

P2

TM-1

TM-2

Time-Stamp
  Starting
  Ending

GUTMID

CID

Status

Billable-Indicator

Account-Value

Account-Value-Type

Function RETRIEVE-ACCOUNT-RECORD

This function requests an agent to send account records to an accounting service. This is the "pull" corollary of the "Account_Flush_Record". Unlike the "Account_Flush_Record", this request is from the accounting service side to the agent.

Function DELETE-ACCOUNT-RECORD-ON-ATTRIBUTES

This function deletes account records from the specified account base, based on attribute types and values. Like Account-Extract-On-Attributes, this function can delete account record(s) keyed by a single attribute type and value or on any combinations. In other words, the function will delete the account record(s) on the values of attributes supplied. The deletions can be performed on any of the following attribute value and/or any combinations:

P-1

P-2

TM-1

TM-2

Time-Stamp
  Starting
  Ending

GUTMID

CID

Status

Billable-Indicator

Account-Value

Account-Value-Type

This function can be used to delete records that have been organized after a roll-up from the account-base.

Function EXTRACT-ACCOUNT-RECORD-ON-ATTRIBUTES

This function returns account records based on attribute types and values. Depending on the attributes specified, this function can be used to retrieve records, entries, journals, or other organized collections.

We designed a very powerful function here by providing the capability to extract account record(s) keyed by a single attribute value or on any combinations. In other words, the function will extract the account record(s) on the values of attribute supplied. The extractions can be performed on any of the following attribute value and/or any combinations:

P-1

P-2

TM-1

TM-2
Time-Stamp
  Starting
  Ending
GUTMID
CID
Status
Billable-Indicator
Account-Value
Account-Value-Type This function will be used to re-organize the account records in the account-base, e.g. during roll-up time, records need to be organized and rolled-up based on GUTMID, and then moved out of the account-base. The account header, the extension record and trailer record are separate records until roll-up time. The organized records will be deleted after being rolled-up.

Definition of Terms

Account-Base: An unordered set of zero or more account records.

Account-Entry: A set of account records containing a common, unique GUTMID, i.e. generated by a single transaction method tree instance.

Account-Journal: A collection of account records generated by a given principal.

Account Record: A set of account header, extension vector(s) and trailer record containing a common CID and GUTMID.

Account Header: A header information record for the account record contains the 7 tuples plus a billable indicator.

Agent: A DSA agent assumes the identity of the person or other principal it is representing. An agent is a "spokesprogram" for a principal.

CID: Conversation Identifier.

Extension-Header: A header information for an extension record, consists of CID, GUTMID, length and type information and billable indicator, used to link the extension vector with the account header.

Extension Vector: A sub-set of Account Record which consists a principal defined collection of {LENGTHI-TYPEIVALUE} attributes.

Extension Record: A combination of extension header and extension vector.

GUTMID: A globally unique identifier for a transaction method tree instance. The GUTMID is produced by the root transaction method (the transaction method instantiated by BSOM, not by receipt of a C-Begin request), and is propagated down the transaction tree constructed by subsequent invocations. The GUTMID may be used to correlate all arcs and nodes involved in a distributed, nested set of transaction method instances.

Principal: A DSA principal is a named collection of transaction methods. Documents, people and applications are principals.

| Account Record and its Associated Fields: | | | |
|---|---|---|---|
| Account-Header | Extension-Header | Extension-Vector | Trailer-Record |
| Length | CID | Length | CID |
| Type | GUTMID | Type | GUTMID |
| P-1 | Length | Value | Time-Stamp |
| TM-1 | Type | | Status |
| P-2 | Billable? | | Trailer-Type |
| TM-2 | | | |
| CID | | | |
| GUTMID | | | |
| Billable? | | | |
| Time-Stamp | | | |

The invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

Having thus described our invention, we now claim:

1. An automated symmetrical data collection apparatus for generating and storing a plurality of accounting records on a network of nodes comprising:
    a middleware agent within each node, the agent monitoring its node for transactions between an operating system and user interface applications loaded onto the node, the agent generating accounting records for the transactions;
    a memory capable of receiving and holding the accounting records, the memory being addressable by the agent;
    a database for receiving and storing the accounting records from the memory; and,
    means for correlating accounting records with one another for associated transactions.

2. An automated symmetrical data collection apparatus for generating and storing a plurality of accounting records on a network of nodes comprising:
    a middleware agent within each node, the agent monitoring its node for a transaction between an operating system and user interface applications loaded onto the node, the agent generating an accounting record for the transaction;
    a memory capable of receiving and holding the accounting record, the memory being addressable by the agent; and
    a database for receiving and storing the accounting record from the memory;
    wherein the accounting record comprises:
        an account header containing an originating principal name, a target principal name, a transaction method name, a conversation identifier, a time stamp and a globally unique identifier; and
        a trailer record containing a trailer-type indicator, the conversation identifier, the globally unique identifier, a trailer-status and a trailer-time-stamp indicating an ending time of a conversation.

3. The data collection apparatus of claim 2 wherein the accounting record further comprises:
    an extension header containing the conversation identifier, the globally unique transaction identifier, an extension length indicator, an extension type indicator and a billable indicator; and
    an extension vector containing a plurality of data fields supplied by an application in use when the transaction was made.

4. The data collection apparatus of claim 3 wherein the same globally unique transaction identifier is propagated down a transaction tree constructed by subsequent invocations, the globally unique transaction identifier being used to correlate a set of transactions performed by independent nodes.

5. A transaction accounting system comprising:

a network containing two or more principals in data communication with each other, said principals capable of selectively sending and receiving transaction requests, each principal corresponding to a node on the network, each node comprising one or more applications and an operating system operatively interfaced therewith via middleware;

means for recognizing the sending and receiving of the transaction requests by the two or more principals;

means for generating an accounting record corresponding to the respective sending and receiving of transaction requests by the two or more principals; and, means for collecting the accounting records from the two or more principals into a database.

6. The transaction accounting system of claim 5 where the means for recognizing, generating, and collecting is one of a plurality of software agents, each principal having such an agent.

7. The transaction accounting system of claim 6 where the agents work transparently vis-à-vis the principal.

8. A transaction accounting system comprising:

a network containing two or more principals in data communication with each other capable of sending and receiving a transaction request, each principal corresponding to a node on the network, each node comprising one or more applications and an operating system operatively interfaced therewith via middleware;

means for recognizing the transaction request;

means for generating an accounting record of the transaction request; and, means for forwarding the accounting records to a database;

wherein the accounting record comprises at least:
a time stamp;
a globally unique transaction identifier;
a locally generated conversation identifier;
the name of the principal originating the transaction request;
the name of the application method in use when the transaction request was made;
a name of a principal receiving the transaction request; and,
the name of a transaction method carried out by the receiving principal in response to the transaction request.

9. The transaction accounting system of claim 8 where the agent further selectively generates and appends an extension record to the accounting record, the extension record comprising:

the locally generated conversation identifier;
the globally unique transaction identifier;
an extension length indicator;
an extension type indicator;
a billable indicator; and
a plurality of data fields supplied by the application in use when the transaction request was made.

10. The transaction accounting system of claim 9 wherein the globally unique transaction identifier generated for a root transaction is used in all accounting records generated after the root transaction.

11. A method of generating an accounting database of transactions on a network having a plurality of nodes, the method comprising:

a) monitoring each node for an outgoing transaction;

b) monitoring each node for an incoming transaction;

c) generating an accounting record on detecting the transactions in steps (a) or (b);

d) caching the accounting records temporarily;

e) periodically storing the accounting record in the accounting database; and f) repeating steps (a) through (e) continuously during network operation;

wherein the accounting records comprise at least:
a time stamp;
a globally unique transaction identifier;
a locally generated conversation identifier;
a name of a principal originating the transaction;
the name of an application method in use when the transaction was requested;
a name of a principal receiving the transaction; and,
the name of a transaction method carried out in response to the transaction requested.

12. The method of claim 11 wherein the same globally unique transaction identifier is used in all accounting records generated after a root transaction.

13. The method of claim 12 where the accounting record further comprises an extension record, the extension record being a plurality of additional data fields provided by the application in use.

* * * * *